United States Patent
Parikh et al.

(10) Patent No.: US 10,380,671 B2
(45) Date of Patent: *Aug. 13, 2019

(54) RECOMMENDATIONS BASED ON BRANDING

(71) Applicant: PayPal, Inc., San Jose, CA (US)

(72) Inventors: Nishith Parikh, Fremont, CA (US); Neelakantan Sundaresan, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 15/220,871

(22) Filed: Jul. 27, 2016

(65) Prior Publication Data

US 2016/0335706 A1 Nov. 17, 2016

Related U.S. Application Data

(63) Continuation of application No. 12/707,618, filed on Feb. 17, 2010, now Pat. No. 9,443,209.

(Continued)

(51) Int. Cl.
*G06Q 30/06* (2012.01)
*G06F 16/35* (2019.01)
(Continued)

(52) U.S. Cl.
CPC ......... *G06Q 30/0631* (2013.01); *G06F 16/36* (2019.01); *G06Q 10/04* (2013.01); *G06Q 30/02* (2013.01); *G06F 16/35* (2019.01)

(58) Field of Classification Search
CPC ......... G06F 17/30864; G06F 17/30598; G06F 17/3061; G06F 17/30637; G06F 17/3064;
(Continued)

(56) References Cited

U.S. PATENT DOCUMENTS 6,556,991 B1 * 4/2003 Borkovsky ....... G06F 17/30696
707/737
7,890,528 B1 * 2/2011 Khoshnevisan .. G06F 17/30864
707/769

(Continued)

OTHER PUBLICATIONS

"U.S. Appl. No. 12/707,618 , Response filed Aug. 27, 2013 to Final Office Action dated May 1, 2013", 11 pgs.

(Continued)

*Primary Examiner* — Dennis Truong
(74) *Attorney, Agent, or Firm* — Maschoff Brennan

(57) ABSTRACT

A method and a system for providing recommendations based on branding are disclosed. In example embodiments, an index comprising predetermined brand relationships is maintained. Each predetermined brand relationship comprises a first brand, a second brand, and a recommendation score between the first brand and the second brand. A corpus containing a plurality of user queries is also maintained. A seed set of brands corresponding to a category in the index is expanded by accessing the corpus containing the plurality of user queries, evaluating user queries of the plurality of user queries that contain a disjunction of brand terms, and identifying a new brand to add to the seed set based on the evaluating.

20 Claims, 21 Drawing Sheets

Related U.S. Application Data

(60) Provisional application No. 61/174,384, filed on Apr. 30, 2009.

(51) Int. Cl.
*G06F 16/36* (2019.01)
*G06Q 10/04* (2012.01)
*G06Q 30/02* (2012.01)

(58) Field of Classification Search
CPC ......... G06F 17/30693; G06F 17/30731; G06F 17/3097; G06F 16/285; G06F 16/3322; G06F 16/35; G06F 16/36; G06F 16/90324; G06Q 30/00; G06Q 30/0601; G06Q 30/02; G06Q 30/0631
USPC ............... 707/769, 737, 765, 741; 705/26.1; 706/12
See application file for complete search history.

(56) References Cited

U.S. PATENT DOCUMENTS

| | | | | |
|---|---|---|---|---|
| 8,260,771 | B1* | 9/2012 | Ortega | G06F 17/30997 |
| | | | | 707/723 |
| 9,449,322 | B2* | 9/2016 | Gupta | G06Q 30/00 |
| 2002/0198882 | A1* | 12/2002 | Linden | G06F 17/30867 |
| 2005/0010475 | A1* | 1/2005 | Perkowski | G06Q 30/02 |
| | | | | 705/14.51 |
| 2006/0122979 | A1* | 6/2006 | Kapur | G06F 17/30648 |
| 2006/0184495 | A1* | 8/2006 | Crosby | G06F 17/30867 |
| | | | | 706/60 |
| 2007/0244872 | A1* | 10/2007 | Hancock | G06F 17/30864 |
| 2008/0140577 | A1* | 6/2008 | Rahman | G06Q 20/3829 |
| | | | | 705/71 |
| 2008/0270356 | A1* | 10/2008 | Anderson | G06F 17/30864 |
| 2009/0106108 | A1 | 4/2009 | Ku | |
| 2009/0276453 | A1* | 11/2009 | Trout | G06Q 30/02 |
| 2009/0281923 | A1* | 11/2009 | Selinger | G06Q 30/02 |
| | | | | 705/26.1 |
| 2010/0169361 | A1* | 7/2010 | Chen | G06F 17/30731 |
| | | | | 707/769 |
| 2010/0268661 | A1* | 10/2010 | Levy | G06Q 30/02 |
| | | | | 705/347 |
| 2010/0281029 | A1* | 11/2010 | Parikh | G06Q 10/04 |
| | | | | 707/741 |
| 2012/0323953 | A1 | 12/2012 | Ortega et al. | |

OTHER PUBLICATIONS

"U.S. Appl. No. 12/707,618, Decision on Pre-Appeal Brief Request dated Jul. 20, 2012", 2 pgs.
"U.S. Appl. No. 12/707,618, Final Office Action dated Apr. 10, 2012", 16 pgs.
"U.S. Appl. No. 12/707,618, Final Office Action dated May 1, 2013", 18 pgs.
"U.S. Appl. No. 12/707,618, Final Office Action dated Nov. 16, 2015", 24 pgs.
"U.S. Appl. No. 12/707,618, Non Final Office Action dated Feb. 6, 2014", 16 pgs.
"U.S. Appl. No. 12/707,618, Non Final Office Action dated Oct. 10, 2012", 16 pgs.
"U.S. Appl. No. 12/707,618, Non-Final Office Action dated Dec. 5, 2011", 14 pgs.
"U.S. Appl. No. 12/707,618, Notice of Allowance dated May 4, 2016", 12 pgs.
"U.S. Appl. No. 12/707,618, Pre-Appeal Brief Request filed Jul. 10, 2012", 5 pgs.
"U.S. Appl. No. 12/707,618, Response filed Jan. 10, 2013 to Non Final Office Action dated Oct. 10, 2012", 10 pgs.
"U.S. Appl. No. 12/707,618, Response filed Mar. 5, 2012 to Non Final Office Action dated Dec. 5, 2011", 13 pgs.
"U.S. Appl. No. 12/707,618, Response filed May 6, 2014 to Non Final Office Action dated Feb. 6, 2014", 11 pgs.
"U.S. Appl. No. 12/707,618, Response fIled Feb. 16, 2016 to Final Office Action dated Nov. 16, 2015", 10 pgs.

\* cited by examiner

| Category Name | Some seed brands |
|---|---|
| Baby Goods | Ameda, Fisher Price, Huggies. |
| Cameras & Photo | Canon, Fuji, Kodak |
| Motors Parts | Bosch, Goodyear, Yamaha |
| Cell Phones & PDAs | AT&T, Apple, Sony |
| Clothing, Shoes & Accessories | Banana Republic, Juicy Couture, Vera Bradley |
| Computers & Networking | Cisco, Logitech, Toshiba |
| Electronics | Bose, Magellan, Plantronics... |
| Health & Beauty | Bath & Body Works, L'Oreal, Oil of Olay... |
| Home & Garden | Black & Decker, Hamilton Beach, Whirlpool... |
| Jewelry & Watches | DKNY, Pulsar, Swatch... |
| Musical Instruments | Gibson, Martin, Paul Reed Smith... |
| Sporting Goods | Callaway, MacGregor, Wilson... |
| Toys & Hobbies | Hot Wheels, LEGO, Playmobil... |

*Figure 3*

| Brand Name | List of Possible Variations |
|---|---|
| Abercrombie and Fitch | Abercrombie, abercrombie fitch, a and f, abercrombit and fitch, abercrombiefitch... |
| Dolce and Gabanna | Dolce, dolce and gabanna, dolce gabanna, d&g... |

*Figure 4*

| |
|---|
| (gucci, seiko, pulsar) watch -paolo -lorus |
| (marc jacobs,michael kors) |
| (dkny, guess, baby phat) watch |
| (dkny, dior, armani, guess, diesel) watch |
| (callaway, ping, jones) hybrid iron 5 |

*Figure 5*

| Seed Brand | Brands Identified (Co-occurrence % with seed brand) |
|---|---|
| Prada | Gucci(11.98) chanel(4.74) miu(3.89) dior(3.79) coach(3.38) miu miu(3.17) dolce(2.65) versace(2.08) fendi(2.08) chloe(2.00) marc jacobs(1.83) |
| Panasonic | Sony(13.19) samsung(4.51) ...digital(0.55) alpine(0.51) fuji(0.46) pelco(0.46) kodak(0.34) onkyo(0.25) aiwa(0.25) bose(0.25) |
| Loreal | L'oreal(43.56) Revlon(6.13) maybelline(3.68) l oreal(1.84) |
| Baby phat | rocawear (11.58) *babyphat* (7.89) apple bottoms (5.85) ecko (5.34) dereon (3.82) apple bottom (3.69) roca wear (3.31) enyce (3.05) guess (2.67) akademiks (2.54) bebe (2.42) coach (1.65) roca (1.65) juicy (1.53) ecko red (1.27) eckored (1.27) jlo (1.15) g unit (1.15) juicy couture (0.76) *bp* (0.25) *babay phat* (0.13) |

*Figure 6*

| Seed Brands | Candidate Brands Identified |
|---|---|
| Seiko, dkny | Longines, swatch, *sekio*, citizen, invicta, tissot, nixon, oris, movado... |
| Prada, coach, gucci | Chanel, fendi, guess, xoxo, brahmin, brighton, quilted, burberry... |
| Ameda, huggies | Pampers, luvs, madela, bilge, submersible, lansinoh, sump, medella, kandoo, reebok... |

*Figure 7*

| Query | Features and Weights |
|---|---|
| apple ipod | gb(4061), gen(4051), mp3(3766), video(3539), player(3164), black(3101), nano(3004), silver(2959) |
| apple dishes | franciscan(8721), butter(4198), glass(3974), small(3045), logo(2887), mark(2887), vintage(2721), usa(2655) |
| halle berry | photo(8612), 8x10(7898), sexy(5074), color(4405), signed(3988), hand(2303), hot(2037), coa(1693) |
| drew barrymore | photo(8092), signed(7521), 8x10(6681), sexy(4327), magazine(3090), nude(2856) |
| 1st sorcerer stone | sorcerers(11177), harry(6573), potter(6573), u(3402), american(3402), dj(3303), ed(3220), true(2981) |
| 9780807281956 | sorcerers(7812), new(5780), book(4776), potter(4167), harry(4167), stone(4167) |

*Figure 8*

| Query 1 | Query 2 | Kind of relationship | Semantic Similarity $K_s$ |
|---|---|---|---|
| jessica alba | sandra bullock | Film celebrities | 0.856 |
| zune | black zune | Generalization / Specialization | 0.918 |
| harry potter | j k rowling | Book character / Book author | 0.631 |
| ps2 | playstation 2 | Abbreviation / Full Name | 0.891 |
| apple player | apple dishes | None other than one common term | 0.000 |
| jessica simpson | shoes | Brand / Product | 0.796 |
| sjp | sarah jessica parker | Initials / Full Name | 0.838 |
| coach bags | coach tote | Synonyms | 0.838 |
| wii system | stereo system | Electronics items | 0.052 |

*Figure 9*

| Brand | Brand Queries |
|---|---|
| Tommy Hilfiger | Tommy hilfiger arder polo, tommy hilfiger red sheet, tommy hilfiger womens size small, hilfiger tommy watch 1780132, tommy hilfiger bucket cap... |
| Chanel | Yellow chanel, chanel 3122, pink chanel earrings, silk scarf chanel, chanel travel bag, chanel flats 6... |
| Omega | Wrist watch omega book, omega necklace gold 16, omega watch crown, mens omega chronograph watch, omega 353... |
| Black & Decker | Blk decker drill, sander blk decker cyclone, black and decker auto tools, black decker, black and decker, black decker drill, black decker toaster oven, black decker 18v, black decker charger... |

*Figure 10*

| Relationship between Brand—Category pairs | Score for the recommendation |
|---|---|
| Canon [Cameras & Photo -> Digital Cameras] — Canon [Cameras & Photo -> Lenses & Filters -> Lenses] | 1.0 |
| Marc Jacobs [Clothing, Shoes & Accessories -> Women's Handbags & Bags -> Handbags & Purses] — Marc Jacobs[Clothing, Shoes & Accessories -> Women's Shoes] | 0.95 |
| Thule [Sporting Goods -> Outdoor Sports -> Cycling -> Accessories -> Car & Truck Racks -> Roof] — Yakima [Sporting Goods -> Outdoor Sports -> Cycling -> Accessories -> Car & Truck Racks -> Roof] | 1.0 |
| Clinique [Health & Beauty -> Makeup -> Primer] — [Health & Beauty -> Makeup -> Sets & Kits -> Clinique] | 0.0 |
| Prada[Clothing, Shoes & Accessories -> Men's Accessories -> Sunglasses -> Prada] — Coach[Clothing, Shoes & Accessories -> Women's Accessories -> Sunglasses -> Coach] | 0.04 |
| Cleveland [Sporting Goods -> Golf -> Clubs] — Titleist [Sporting Goods -> Golf -> Clubs] | 0.09 |

YOU PURCHASED WOMENS SHOES BY KENNETH COLE...

SEE MORE WOMENS SHOES BY STEVE MADDEN

CLICK HERE

YOU PURCHASED A TANK TOP BY CHICO'S

SEE OTHER CLOTHING BY CHICO'S

CLICK HERE

*Figure 12B*

| Category | SBDC Impressions (CTR) | DBSC Impressions (CTR) |
|---|---|---|
| Clothing, Shoes & Accessories | 32,230 (2.2%) | 31,967 (1.9%) |
| Electronics | 19,758 (1.1%) | 22,664 (1.9%) |
| Home | 391 (2.8%) | 1, 447 (2.2%) |
| All Other Categories | 45,167 (1.5%) | 113,429 (1.8%) |
| Total | 97,546 (1.7%) | 169,507 (1.8%) |

*Figure 19*

| Category | *SBDC* Impressions(CTR) | *DBSC* Impressions(CTR) |
|---|---|---|
| Clothing, Shoes & Accessories | 179K (1.8%) | 175K (1.6%) |
| Electronics | 126K (1.0%) | 128K (1.2%) |
| Home | 15K (1.5%) | 52K (1.1%) |
| All Other Categories | 141K (1.4%) | 132K (1.2%) |
| Total | 460K (1.4%) | 486K (1.3%) |

*Figure 20*

RECOMMENDATIONS BASED ON BRANDING

RELATED APPLICATIONS

This application is a Continuation of U.S. patent application Ser. No. 12/707,618 filed Feb. 17, 2010, which claims priority to, and the benefit of, U.S. Provisional Application No. 61/174,384 filed Apr. 30, 2009, all of which are hereby incorporated by reference.

TECHNICAL FIELD

The present application relates generally to the technical field of database management and, in one specific example, to providing recommendations based on branding.

BACKGROUND

Consumers may select goods or services for purchase based on the brands of those goods or services. Brand-based shopping is popular in product lines like clothing and shoes. In an online environment, a consumer may be able to search for a particular brand or sort results according to brand.

BRIEF DESCRIPTION OF THE DRAWINGS

Some embodiments are illustrated by way of example and not limitation in the figures of the accompanying drawings in which:

FIG. 3 is a table of example seed brands according to an embodiment.

FIG. 4 is an example table of variations of brand names according to an embodiment.

FIG. 5 is an example list of queries that may be received from a user.

FIG. 6 is an example table of additional brands that may be identified based on queries received from the user.

FIG. 7 is an example table of additional brands that may be identified based on more than one seed brand.

FIG. 8 is an example table of product features and weights identified based on a query.

FIG. 9 is an example table noting a type of relationship between two queries.

FIG. 10 is an example table to associate a particular brand with one or more queries.

FIG. 11 is an example table of brand-category pairs and an associated recommendation score for each of the brand-category pairs.

FIGS. 12A and 12B depict example user interfaces generated based on the brand-category pairs.

FIG. 19 is a table of results of an experiment conducted according to the techniques described.

FIG. 20 is a table of results of an experiment conducted according to the techniques described.

DETAILED DESCRIPTION

Example methods and systems to provide recommendations based on branding are described. In the following description, for purposes of explanation, numerous specific details are set forth in order to provide a thorough understanding of example embodiments. It will be evident, however, to one skilled in the art that the present invention may be practiced without these specific details.

In an online publication system, a user may search for, view, bid on, provide feedback about, and/or buy items for sale. Each item for sale may, in turn, be associated with one or more categories such as apparel, home, electronics, toys, etc. The user may further select items for sale based on a brand of the item. The brand may be a registered trademark, service mark, or some other indicator of the origin of the item.

Users may be loyal to specific brands (e.g., may only want to view or purchase products associated with a particular brand or set of brands) and/or may use a brand as a search term to narrow the scope of a query. In some instances, a user may be interested in purchasing items within a same category having different brands (e.g., the user may be interested in two or more brands of women's shoes). In other instances, a user may be interested in items in different categories having the same brand (e.g., the user may be interested in women's apparel and women's shoes of the same brand). In further instances, a user may be interested in different brands in different categories (e.g., the user may be interested in a stereo receiver of one brand and stereo speakers of another brand).

In some embodiments, a brands engine determines the brands that a user might be interested in by identifying brand relationships with a brand itself, with other brands, and within and across product categories. The brand relationships are based, in part, on queries submit by potential buyers. As used herein, the term, "brand relationship" is used to refer to an identified user affinity for the same brand across product categories, for different brands within the same category, or for different brands across product categories.

Figure 1:
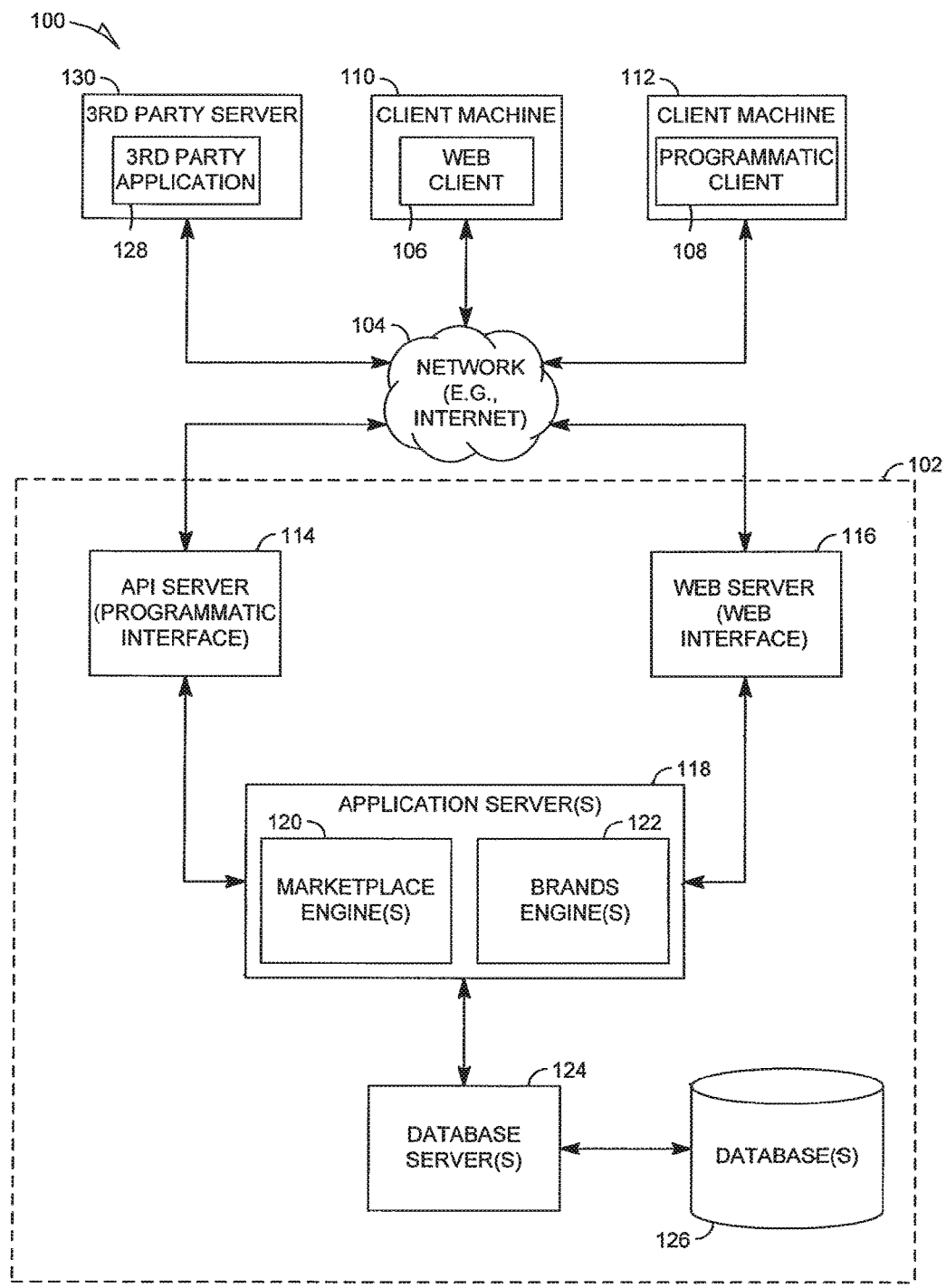
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or online publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace engines 120 and brands engines 122. The application servers 118 are, in turn, shown to be coupled to one or more databases servers 124 that facilitate access to one or more databases 126.

The marketplace engines 120 may provide a number of marketplace functions and services to users that access the networked system 102. The brands engines 122 may likewise provide a number of services and functions based on identified brand relationships to users.

Further, while the system 100 shown in FIG. 1 employs a client-server architecture, the present invention is of course not limited to such an architecture, and could equally well find application in a distributed, or peer-to-peer, architecture system, for example. The various marketplace and brands engines 120 and 122 could also be implemented as stand-alone software programs, which do not necessarily have networking capabilities.

The web client 106 accesses the various marketplace and brands engines 120 and 122 via the web interface supported by the web server 116. Similarly, the programmatic client 108 accesses the various services and functions provided by the marketplace and brands engines 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
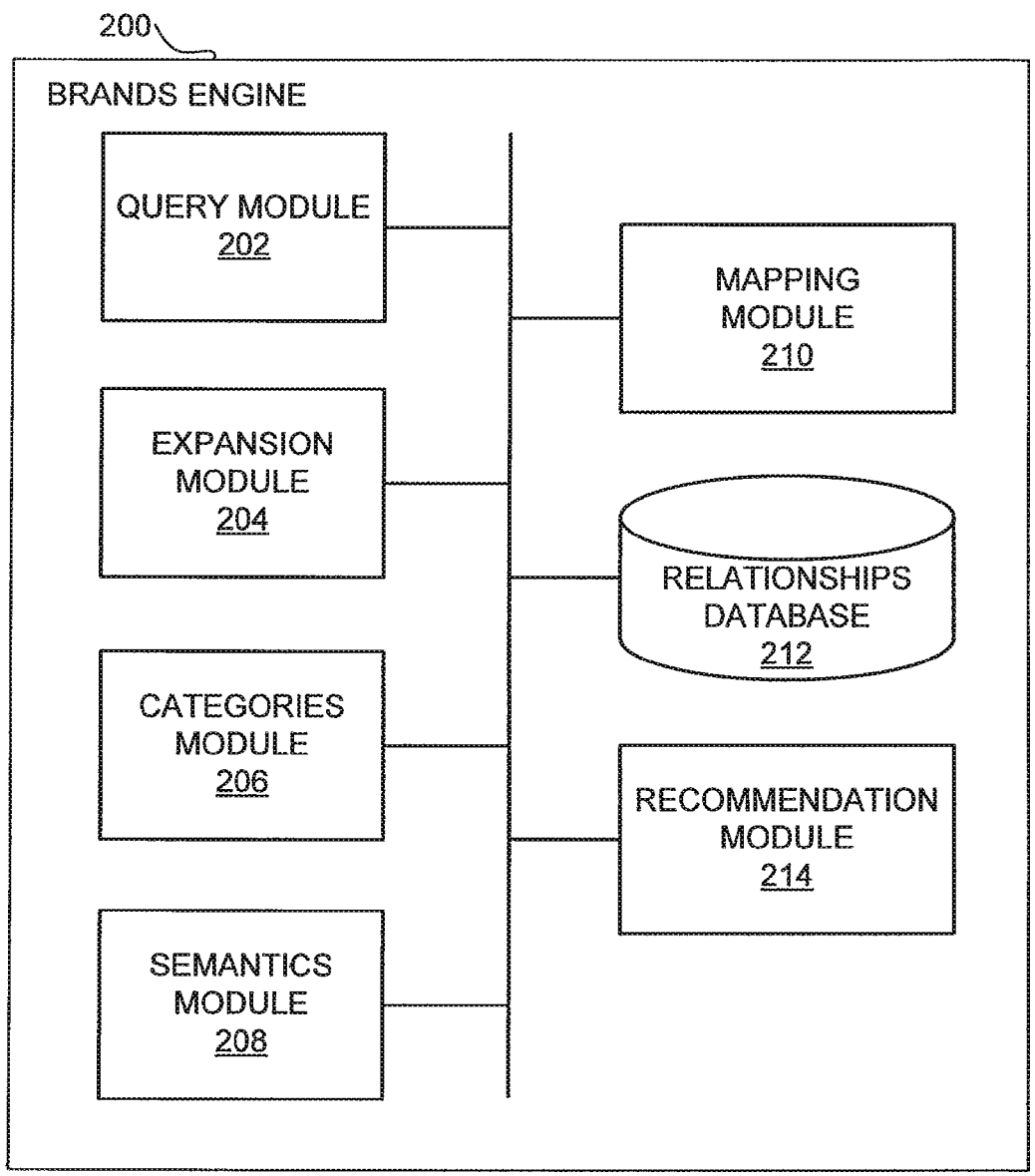
FIG. 2 is a block diagram of an example brands engine according to some embodiments.

FIG. 2 is a block diagram of an example of a brands engine 200 according to some embodiments. The brands engine 200 may comprise the brands engine 122. The brands engine 200 may form a part of the networked systems 102. Generally, the brands engine 200 is to identify and access brand relationships to, for example, provide recommendations to users.

A query module 202 is to access user queries and identify brands within the queries. The queries may be accessed from the database(s) 126 and/or collected in real-time via the network 104.

An expansion module 204 is to expand one or more seed sets of brands based on the accessed queries to add brands to the seed sets. The seed sets may be provided by a human user and contain a list of brands known to be associated with a particular category. The seed sets may be organized according to product category or according to domains that are composed of more than one category. The expansion module 204 may access a seed set of brands for each of the product categories (or domains) generated by a human operator. An example of seed sets for various domains is shown in FIG. 3. FIG. 3 includes a table having a first column that identifies a particular category. The table includes a second column that contains a record of brands associated with the category of the first column. While the seed sets shown in FIG. 3 illustrate three seed brands for each category, it is understood that a seed sets for a category may contain more or fewer seed brands. As shown in FIG. 4, the seed set (or a separate seed set of variations) may include alternate spellings, synonyms, and/or acronyms of the brands in the seed set as provided by a human user.

To expand the seed sets of the brands and the variations, a corpus containing thousands of user queries accessed by the query module 202 is mined. The corpus may include queries with advanced operators in them. Users entering the advanced queries are able to specify conjunction, disjunction, phrase match, and/or negation in queries. Typically, brand queries involving multiple brands may specify brands through these operators. Entities that are of the same type tend to get queried through disjunctive queries (e.g., those containing a logical OR operator). For brand mining, the expansion module 204 evaluates queries containing a disjunction. These queries may be of the form:

$$q_i=(\cdot *)(D_j)(\cdot *)$$

where the middle term is the disjunction and the outer terms are other query terms that may or may not include a disjunction. Some example queries are shown in FIG. 5 and are described in greater detail below.

The disjunctive portion is a disjunction of various terms. It can be described as $$D_j=(b_1,b_2\ldots,b_n,t_1\ldots t_m)$$

where $b_i$ represents brand name terms and $t_i$ represent non-brand name terms in the disjunctive query. In some instances, the expansion module 204 may only consider disjunctions that have at least one seed brand in them. Additionally or alternatively, only disjunctions having at least two terms total may be evaluated (e.g., where (m+n) ≥2). For example, the disjunctive portions of the queries in FIG. 5 include: (gucci, Seiko, pulsar), (marc Jacobs, michael kors), (dkny, guess, baby phat), (dkny, dior, armani, guess, diesel), and (callaway, ping, jones), respectively.

Terms that occur together frequently with seed brands are identified as candidates for expanding the brand set. Two thresholds are determined experimentally: the minimum number of co-occurrences, $Co_{min}$, and minimum co-occurrence percentage, $Copct_{min}$. Co-occurring terms found together less than $Co_{min}$ times are removed from the candidate list. Similarly, if out of all disjunctions in which the terms are found, the percentage of disjunctions in which the terms co-occurred is less than $Copct_{min}$, then that candidate brand is removed. Some examples of brands that have been identified as described are shown in FIG. 6.

To correct for false positives (e.g., "digital" associated with the brand "Panasonic") and to further expand the seed list of brands and/or the seed list of variations, the queries may be analyzed using pattern-mining techniques. In one example embodiment, for each brand "seed" in a domain, an inverted index I may be built from the corpus containing user queries. Using the inverted index, given a term t, all queries $q_i$ that contain the term t can be retrieved quickly. Also, the data in the index I is organized in such a way that the popularity f (frequency) of any query can be retrieved. To illustrate, given the term "coach," queries of the form "coach bag" and "coach shoes" can be analyzed quickly to identify the frequency of the query. The results of the query may include the terms followed of a parenthetical indication of popularity (e.g., coach bag (1000), coach shoes (950)). The parenthetical indication of popularity is the number of times a brand query includes both the terms out of a given number of queries.

The queries are decomposed based on dictionaries. The dictionaries may be externally provided or generated based on data about user activity. Each entry in the given dictionary is a term. For example, the query, "harry potter book," may be decomposed into two terms—"harry potter" and "book." The process described below maps a brand to different terms which is referred to as "representing the brand as a vector in term dimensions." For example, the brand coach might be mapped to the terms "bags," "handbags," "soho," "hobo," "black," "sunglasses," "new," and so on. Each of these terms will also have a score for the brand coach possibly indicating that brand coach is more strongly associated with the term "bags" and less strongly with the term "sunglasses"

In this process, the queries q from the inverted index I that contain a particular seed brand b may be retrieved and placed in a set $Q_b$. An empty set of terms T is created. For every query q found in $Q_b$, terms $t_i$ in the queries q that co-occur in user queries with the brand b are found and added to the set T. A score may be determined for each term $t_i$ in set T that is equal to a sum of the popularity f of every query q in the set $Q_b$ that contains within it the term $t_i$. This score represents brand b as a vector in term dimensions. This step may be repeated for each seed brand b in the seed list of brands.

For every term $t_i$ in T corresponding to the brand b, all queries from the inverted index I which contain term $t_i$ are retrieved. Every term $t_i$ is represented in term dimensions as described above. A union set B of all terms $b_c$ that are used to represent term $t_i$ contains the candidate brands for expansion. Every candidate brand $b_c$ in the union set B may be represented as a vector in term dimension as described above. To illustrate, the objective is to represent a brand like coach with terms like "sunglasses" and "handbags." These terms are $t_i$'s. Each $t_i$ is selected and again represented using some other terms. In this case, say "sunglasses," can be represented by terms like "black," "coach," "prada," "gucci," "new," "womens," "mens," "sz4," etc. These new terms can be referred to as $b_c$. The results include such $b_c$'s for every $t_i$. The union set of all such $b_c$'s is B.

Now as the candidate brands $b_c$ and the original seed brands b are both in the term dimension, the similarity between the candidate brand and the seed brands can be calculated by taking a dot product of the normalized vectors. The average score for a brand candidate $b_c$ is an average value of its cosine similarity with all the brands b in the seed list.

Candidate brands $b_c$ with a score below a pre-determined threshold $t_{min}$ are rejected and not added to the seed set of brands for that particular category. In some instances, the threshold $t_{min}$ is determined experimentally. The rest of the candidate brands $b_c$ having a score that meets or exceeds $t_{min}$ are added to the seed set of brands for the category.

In some instances, the queries may be tokenized into terms based on statistically significant phrases, so that brand names with more than one token in them can be mined. Some brands discovered using the described pattern mining techniques described above are shown in FIG. 7. This is similar to the process described above to represent a brand in term dimensions. Based on external dictionaries, a query is decomposed into one or more terms. This process of decomposition is referred to as tokenization.

While some false positives may be generated by both techniques used by the expansion module 204 individually, by using both techniques together and keeping only brands detected using both techniques, the seed set of brands may be expanded a reduced number of false positives.

A categories module 206 is to access category data such as category definitions, category structures, and metadata about the categories. Each category may be associated with a product domain such as apparel, autos, baby goods, and the like. The categories may be organized according to a hierarchy or other logical structure. The categories may be accessed from the database(s) 126 and/or collected in real-time via the network 104.

In the networked system 102, sellers or publishers may categorize the items described (e.g., that may be for sale) into different product categories. The structure of the categories may be tree-like. For each high-level category in the tree-like structure, the depth and span of the tree is different and may be determined based on amount of items for sale, ease of use, and other factors. The lowest level categories in the tree structure may be identified using a unique numeric identifier. Some branches of the tree for the high-level category "Clothing, Shoes & Accessories" may include:

Clothing, Shoes & Accessories→Costumes & Reenactment Attire→Costumes→Infants & Toddlers
Clothing, Shoes & Accessories→Costumes & Reenactment Attire→Costumes→Boys
Clothing, Shoes & Accessories→Costumes & Reenactment Attire→Reenactment Attire→Civil War The semantics module 208 is to associate the categories with one or more brands based on the corpus of queries. The semantics module 208 mines relationships between queries and maps the queries to the categorization structure of the categories module 206.

To identify semantic relationships amongst queries and build a relationship graph, a number of techniques may be used. These techniques include calculating relationships according to similarity of common terms in queries, mining similarities from user queries in the same session, and/or mining similarities based on terms used in completed transactions. Each of these techniques is discussed in greater detail below. The results of these techniques may be combined to build a semantic query network.

To connect queries with textual similarity, every query is represented as a set of terms found in the query. So a query Q can be represented as $Q=W_q=\{W_1, W_2, \ldots W_n\}$ where $W_i$ (where i=1, 2, . . . n) are the unique terms in the queries and n is the total number of unique terms in query Q.

For each query Q, candidate queries $Q_c$ are found such that $W_q \subseteq W_{qc}$. The candidate queries $Q_c$ are queries that can be formed by adding new terms to query Q. Then query Q and each candidate query $Q_c$ is connected in a term connection graph using an edge. Queries $Q_l$ are found by dropping words from query Q such that $W_{ql} \subseteq W_q$. All such queries $Q_l$ may be connected with the node Q in a term connection graph. The term connection graph is a way to associate queries based on terms. It is a network of queries where queries are connected based on presence of common terms. To illustrate, a query like "harry potter book" would be connected to other queries like "harry potter," "book," "harry potter memorabilia," and so on).

The dissimilarity between queries increases as the number of differing terms in the queries increase. The term distance used to measure the dissimilarity between two queries (e.g., query $Q_a$ and query $Q_b$) is the number of terms D by which the two queries differ based on the term connection graph. A simple function is used to normalize the edge score between 0 and 1. If the terms of the queries $Q_a$ and $Q_b$ are such that either is a subset of (or the same as) the other (e.g., $W_{qa} \subseteq W_{qb}$ or $W_{qb} \subseteq W_{qa}$), the normalized edge score, referred to as similarity $T_s$ between two queries $Q_a$ and $Q_b$ is calculated by $$T_s = \left(\frac{1}{2^D}\right).$$

If neither is a subset of the other, then $T_s=0$, and those queries are not connected in the term connection graph. Thus, the similarity of common terms in queries is determined.

User sessions are mined to find the queries received from a user in the course of a session on the networked system 102 (e.g., a shopping session in an online marketplace). A state machine is built using queries submitted by the user in the session that generated a session relationship graph that indicates semantic similarity among the queries. To infer the semantic relationships, each possible combination of two consecutive states (e.g., queries) in the state machine is identified. So, if a user performs a series of queries Q1, Q2, Q3, and Q4, then query Q1 is connected to query Q2, Q2 is connected to Q3, and Q3 connected to Q4. The session relationship graph is built using the state machine. It is a network of queries where one query is connected to another based on the number of users issuing the two queries in the same session during their activity. For example, if some number of users greater than a threshold T issue both queries "ipod" and "zune" in a session, then the session relationship graph includes a connection between the queries "ipod" and "zune".

The information is aggregated across a plurality of user sessions in a query log sample or another corpus of queries. In some instances, only user sessions in which the user purchased an item are identified. Alternatively or additionally, only connections between queries that are observed in at least three user sessions may be used.

The strength of the connections is based on the amount of users whose sessions shared these search terms. To illustrate, for two queries, Q1 and Q2, if the relationships is observed in a number of sessions N, then the session based similarity score $S_s$ between Q1 and Q2 may be assigned as:

$$\begin{aligned}
S_s &= 0.9 \quad \text{if } N > 1000 \\
&= 0.8 \quad \text{if } 10000 \geq N > 6000 \\
&= 0.7 \quad \text{if } 6000 \geq N > 1000 \\
&= 0.6 \quad \text{if } 1000 \geq N > 200 \\
&= 0.5 \quad \text{if } 200 \geq N > 50 \\
&= 0.4 \quad \text{if } 50 \geq N > 20 \\
&= 0.3 \quad \text{if } 20 \geq N > 6 \\
&= 0.2 \quad \text{if } 6 \geq N > 4 \\
&= 0.1 \quad \text{if } 4 \geq N \geq 3 \\
&= 0 \quad \text{otherwise}
\end{aligned}$$

The values presented above to calculate the similarity score $S_s$ may be determined heuristically and/or through qualitative experiments to normalize the similarity score between 0 and 1. It is noted that that similarity score may be determined in a number of alternative ways and may or may not be normalized.

To mine similarities based on terms used in completed transactions, a kernel function for query similarity maps a query to the words in title and the attributes of product items that are sold as part of a completed transaction in an online marketplace. To map the queries, the user sessions are mined to track user activity in the online marketplace following every unique query issued by user. The kernel function maps the features of the items bought to the particular search query that was submit by the user before buying the item.

The features of the items that are extracted for association are words found in the title of the item, other attributes of the item which might identify the category of the item, or an ISBN/UPC number. When an item is bought, the features of the item are extracted and used to modify weights associated with the features based on the query that was submit by the user before buying the item. The feature extraction and weighting generates a rich data set that maps a query to different features with specific weights. FIG. 8 shows some queries and the corresponding mapped features along with each associated weight in parenthesis.

As is evident from FIG. 8, the queries, "apple ipod" and "apple dishes" are associated with significantly different features. The query "apple ipod" is associated with features such as "gb" and "gen" while the query "apple dishes" is associated with features "franciscan" and "butter." Based on these features and weights, the semantics module 208 is correctly able to calculate a low semantic similarity between the two queries even though the queries share the term "apple."

As shown in FIG. 8, while the queries "Halle Berry" and "Drew Barrymore" do not share any terms, the two queries do share features like "photo," "signed," "sexy," and "8×10." These shared features indicate some level of semantic similarity between the two queries. In this example, both are the names of famous actresses and merchandise related to both that is bought and sold is similar. Likewise, there is a commonality in features between the queries, "1st sorcerer stone" and "9780807281956." While these queries do not share any terms, the features themselves indicate the semantic similarity between the ISBN ("9780807281956") for the book "Harry Potter and the Sorcerer's Stone" and the query, "1st sorcerer stone."

To calculate a semantic similarity score $K_s$ between two queries, every query $Q_i$ is represented by a vector $v_i$ that contains the top n features for the query $Q_i$. In some instances, n is less than or equal to 25. The query $Q_i$ may be represented by the Euclidean length (i.e., $L^2$ norm) of the vector $v_i$. Hence, $$Q_i = \frac{v_i}{\|v_i\|_2}.$$

The semantic similarity $K_s$ between queries $Q_1$ and $Q_2$ is calculated by taking the dot product of the queries.

$$K_s = Q_1 \cdot Q_2 = \frac{v_1}{\|v_1\|_2} \cdot \frac{v_2}{\|v_2\|_2}$$

As the $L^2$ norm of the query representations is calculated before taking the dot product to find the semantic similarity, the semantic similarity $K_s$ is an inner product with a bounded norm. As only positive components are used for the vectors, $K_s$ will lie between 0 and 1. Values of $K_s > 0.5$ may indicate a significant semantic similarity and the relationship between those queries is stored for later access. Some examples of query pairs and the value of the semantic similarity $K_s$ calculated in the above manner are described below in FIG. 9.

The three techniques (e.g., calculating relations according to similarity of common terms in queries, mining similarities from user queries in the same session, and/or mining similarities based on terms used in completed transactions) described result in a score ($T_s$, $S_s$, and $K_s$, respectively) between 0 and 1 that represents the similarity between two queries. The three results may be combined linearly, resulting in a composite similarity score $C_s$. The following formula may be used to make the combination:

$$C_s = \alpha T_s + \beta S_s + \gamma K_s$$

where $\alpha$, $\beta$, and $\gamma$ are coefficients that weigh the three similarity techniques used. By enforcing the condition that $\alpha+\beta+\gamma=1$, the composite similarity score $C_s$ is calculated to lie between 0 and 1 for any arbitrary pair of queries.

Textual relationships may not capture synonyms and other semantic relations. Further, session-based relationships may be inaccurate if a user's intent changes during the session. Query mapping to higher dimensional space and a function over it, as described herein, is a useful similarity measure, but it is useful only when enough activity around the query exists to be able to map it to appropriate features. Thus, every individual technique has its own advantages and limitations. For brand-based recommendations, brand relationships may be determined with higher level of confidence using a combination of the three techniques to provide higher quality recommendations. It is understood that fewer than three techniques may be used.

A mapping module 210 to map a query q to a vector of categories and weights is also provided in the brands engine 200. Each item on sale in the online publication system has a unique category associated with it by the categories module 206. By mining session logs to see which items were viewed, bought, or bid upon after a user submits a query, the terms in the query may be probabilistically associated with different categories.

To illustrate, if in the history of user sessions after performing the query "battery," 90% of people clicked on items listed in Category 81074 (Computers & Networking>Pc Components>For Desktops>Power Supplies>Standard ATX Power Supplies) and the remaining 10% of users clicked on items listed in Category 3312 (Cell Phones & PDAs>Cell Phones & Smartphones) then the mapping module 210 may decompose the query q="battery" into a unit vector (e.g., category-81074=0.994, category-3312=0.110).

To map the brands to one or more categories, the mapping module 210 may generate an inverted index of all queries and their corresponding terms as described above. The inverted index may be used to retrieve all queries that contain a given term or the conjunction of a set of given terms.

Given the expanded seed set of brands generated by the expansion module 204 (and the corresponding alternative variations), the generated inverted index may be evaluated for queries that have a brand specified by the user. The query results in a set of brand-related queries $S_b$. A few example queries and the corresponding brand associated with these queries are shown in FIG. 10. The set $S_b$ may be used to filter the known semantic relationships to preserve relationships e between queries $q_1$ and $q_2$ such both that $q_1$ and $q_2$ are elements of the set of brand related queries $S_b$.

As a result of filtering the known semantic relationships, a Semantic Query Network is obtained that has user queries with brand intent and relationships amongst them. This network is referred to as N.

The Semantic Query Network N relates different queries $q_1$ and $q_2$. Every query $q_i$ is associated with at least one brand B. Each query in the network N may be mapped to its respective category vectors as described above. Because the Semantic Query Network N includes relationships between queries that include brand terms and because every query is mapped to its category vector, a query-query relationship is transformed into a brand:category-brand:category relationship.

To illustrate, a connection between queries "guess xs" and "bebe xs" in the network N may be transformed to a connection between Brand:Guess(Men's Clothing:0.889, Women's Clothing:0.458) and Brand:Bebe(Men's Clothing:0.110, Women's Clothing:0.994). The weight on this transformed edge is set to the same value as the edge between the queries "guess xs" and "bebe xs" in network N ($C_s$). This results in an index of relationships between different brand vectors in category dimensions and the strength amongst them. These relationships may be normalized to obtain linkage between different Brand:Category combinations. A normalized index may be used for making recommendations to subsequent users. The recommendation scores are normalized between 0 and 1, so that the best recommendations get a score of 1 and the least strong ones a score of 0. The normalized index has entries of the form shown in FIG. 11. The normalized index of FIG. 11 may be stored in a relationships database 212.

As seen in FIG. 11, the recommendations may be for substitute brands in the same category or for the same brand but different categories of products. A recommendations module 214 may access the relationships database 212 to identify recommendations relating one brand to another within the same category, relating one brand across more than one category, and/or one brand in a category to another brand in a different category. For example, men who shop for sunglasses having the brand "Prada" might look for women's sunglasses having the brand "Coach" as a gift. Also, the recommendations are scored based on strength of relationships observed in the Semantic Query Network N and the mapping of queries to categories. Recommendations having a score below a certain threshold may not be shown, or when there are multiple recommendations for some scenario, the recommendations may be sorted by the score and the best recommendations may be used for merchandising.

Based on the brand relationships stored in the recommendations database 212, a recommendations module 214 may generate one or more recommendations to a subsequent user of the online publication system. The recommendations module 214 may, in turn, generate one or more user interfaces in response to queries or purchases made by the subsequent user. Example user interfaces 1200 and 1250 are shown in FIGS. 12A and 12B, respectively. The user interface 1200 depicts a recommendation for a different brand in the same category based on a user purchase, while the user interface 1250 depicts a recommendation for a different category for the same brand.

Figure 13:
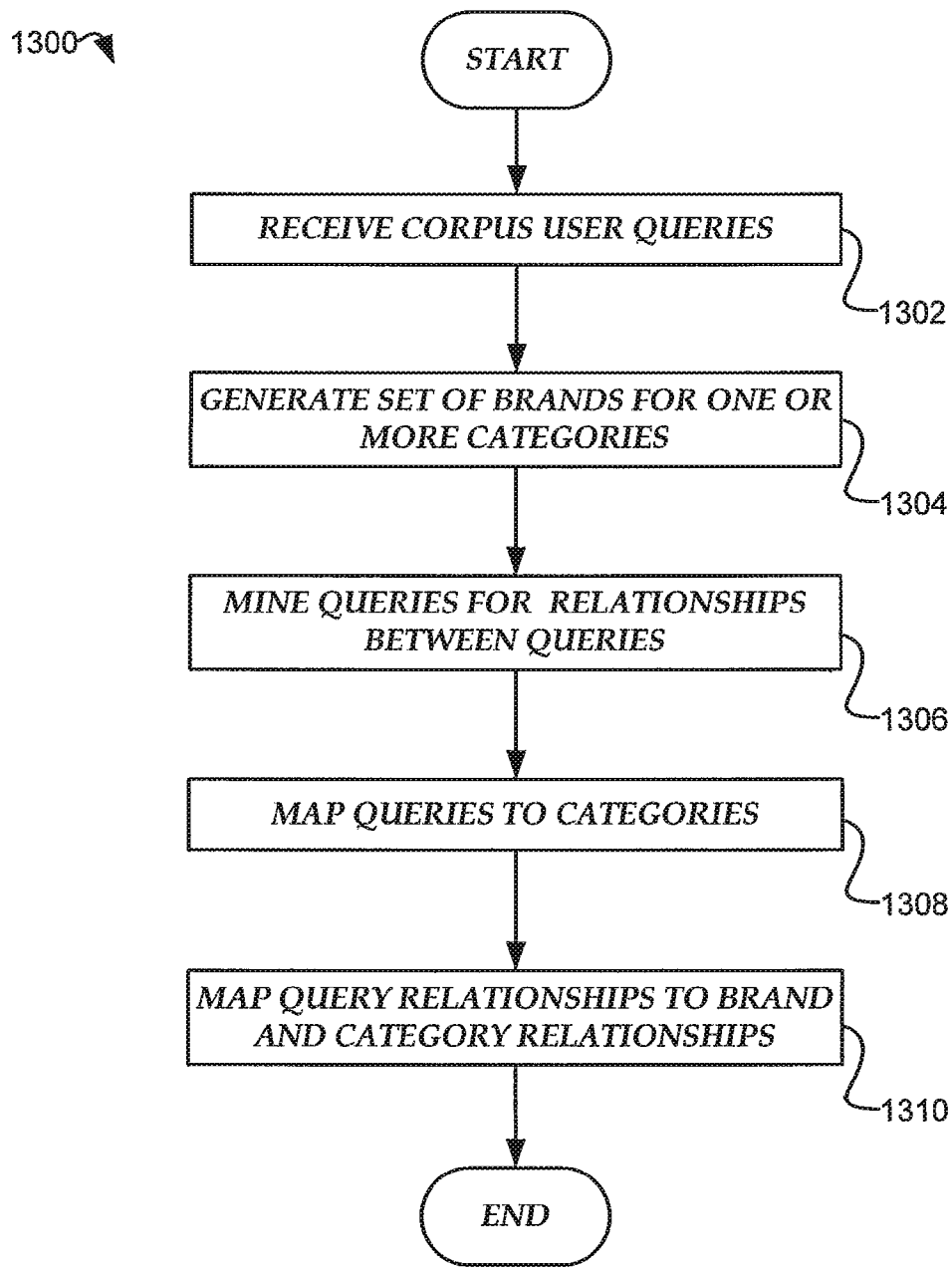
FIG. 13 is a flowchart of an example method for creating a relationships database according to various embodiments.

FIG. 13 is a flowchart of an example method 1300 for creating the relationships database 212 using the brands engine 200 according to various embodiments. The relationships database 212 may be accessed by the recommendations module 214 to provide one or more recommendations to a user of an online publication system based on a user query or a purchase made by the user.

In a step 1302, a corpus of user queries is accessed. The corpus may be collected over a period of time, such as two weeks, by the online publication system. The corpus may include the submitted queries themselves, user session data, and/or purchase data based on the queries.

In a step 1304, a set of brands for one or more categories is generated. The set of brands may be generated by the category module 202 and the expansion module 204 as described above. In other embodiments, the set of brands may be generated using other techniques.

In a step 1306, the corpus may be mined to identify relationships between the queries and described in connection with the semantics module 208. Alternatively or additionally, other mining techniques may be used.

In a step 1308, the queries may be mapped individually to one or more categories by the categories module 206 in conjunction with the semantics module 208.

In a step 1310, the query relationships identified in step 1306 are mapped to brand and category relationships by, for example, the mapping module 210. The mapped brand relationships may be stored for later retrieval in, for example, relationships database 212.

Figure 14:
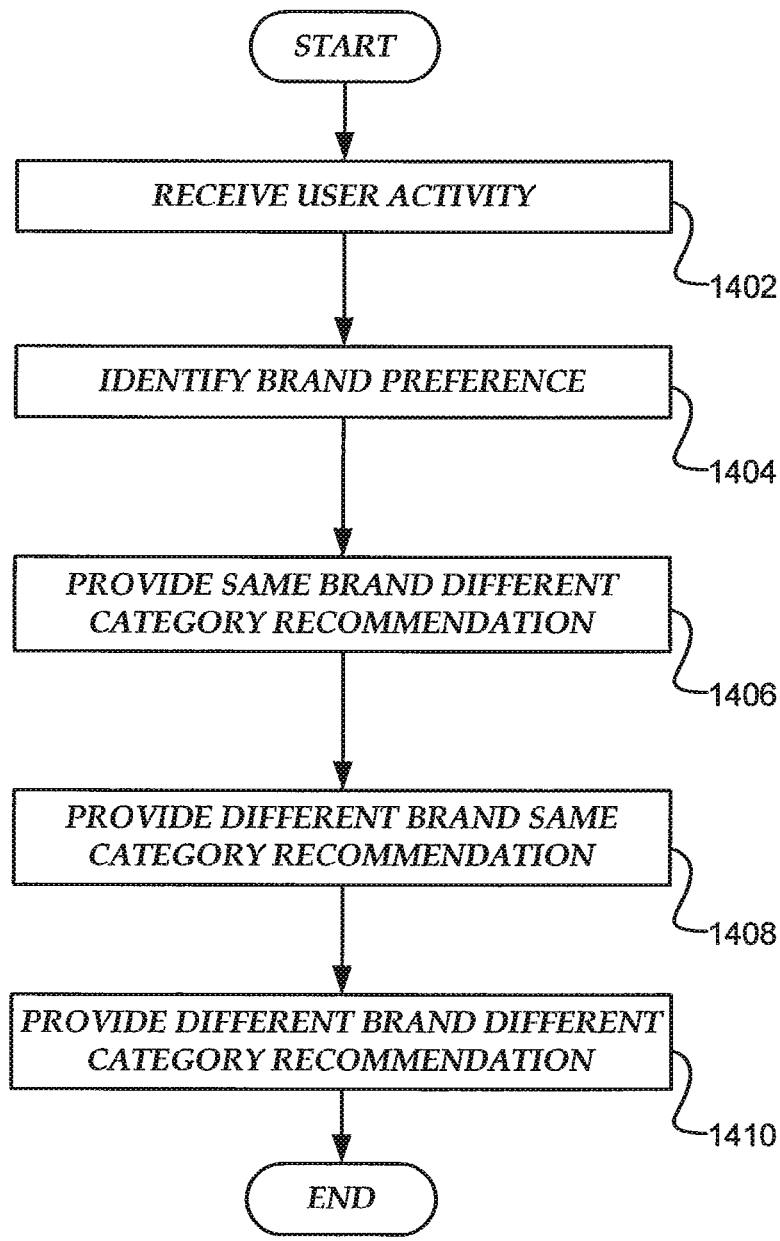
FIG. 14 is a flowchart of an example method for providing recommendations using the brands database according to various embodiments.

FIG. 14 is a flowchart of an example method for providing recommendations using the relationships database 212 according to various embodiments. The recommendations may be provided via a user interface within the online publication system, in an electronic communication (e.g., an email, short message service (SMS) message, or the like) sent to the user, or by another communication channel.

In a step 1402, a user activity is received in the online publication system. The user activity is an input provided by the user at a user interface. The user activity may include, for example, navigating through one or more category menus, submitting a query, submitting a bid in an online auction, purchasing an item, submitting a request to be alerted if the status of an item for sale changes, or submitting a request to be alerted if an item becomes available for sale.

In a step 1404, a brand preference is identified based on the user activity. The brand preference may be determined based on one or more brands included in a query, a brand of item purchased or bid on by the user, or another brand-based action.

In an optional step 1406, a first recommendation for items having the same brand in another category is provided. The first recommendation may be provided by querying the inverted index of FIG. 11 based on the identified brand and a category associated with the user activity. The recommendation may be provided via a user interface or electronic message sent to the user.

In an optional step 1408, a second recommendation for items within the same category but having a different brand is provided. The second recommendation may be provided, for example, if a user has bid on an item but has lost the auction. The second recommendation may be provided by querying the inverted index of FIG. 11 based on the identified brand and a category associated with the user activity.

In an optional step 1410, a third recommendation for items in a different category and having a different brand may be provided. The third recommendation may be provided by querying the inverted index of FIG. 11 based on the identified brand and a category associated with the user activity.

Figure 15:
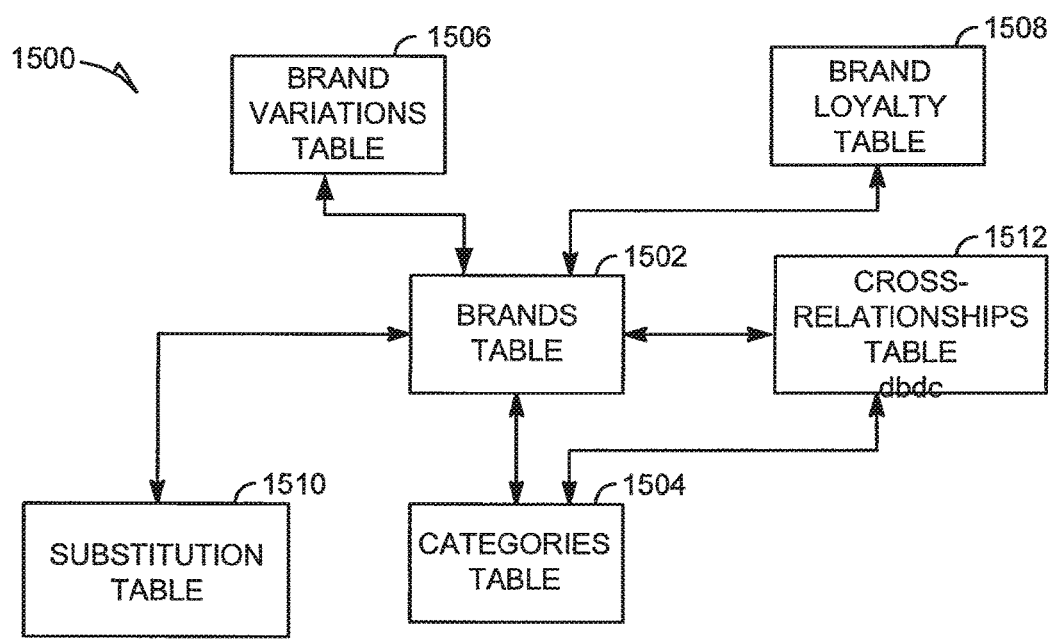
FIG. 15 is a high-level entity-relationship diagram, illustrating various tables that may be maintained, and that are utilized by and support the brand applications.

FIG. 15 is a high-level entity-relationship diagram, illustrating various tables that may be maintained in the database 126 and/or the relationships database 212, and that are utilized by and support the brands engine 122. A brands table 1502 contains a record for each brand in the seed set and for each brand identified by the expansion module 204.

The tables 1500 also include categories table 1504 in which are maintained category definitions and item records for goods and services associated with the categories that are available to be, or have been, transacted via the networked system 102. Each category record within the categories table 1504 may furthermore be linked to one or more brand records within the brand table 1502, so as to associate a category and one or more brands with each item record.

To provide a user-friendly environment, the online publication system may associate items for sale that are substantially similar or identical to one another to a single product description. To illustrate, the online publication system may have several listings of the Apple iPod 4G portable media players for sale. Rather than publishing a separate description of each, the online publication system may generate a product description for the Apple iPod 4G portable media player to which the individual players for sale are associated. A seller may associate an item for sale with a product description. In these instances, the categories table 1504 may include product records that, in turn, are associated with one or more item records.

A brand variations table 1506 contains a record for each brand that is associated with one or more records of variations of the brand. The variations may include alternative spellings, shortened forms, acronyms, or the like. The brand variations table 1506 may be queried to determine whether a user activity is brand-specific. A user activity may be brand-specific if the query contains at least one term within the brand variations table 1506.

Figure 16:
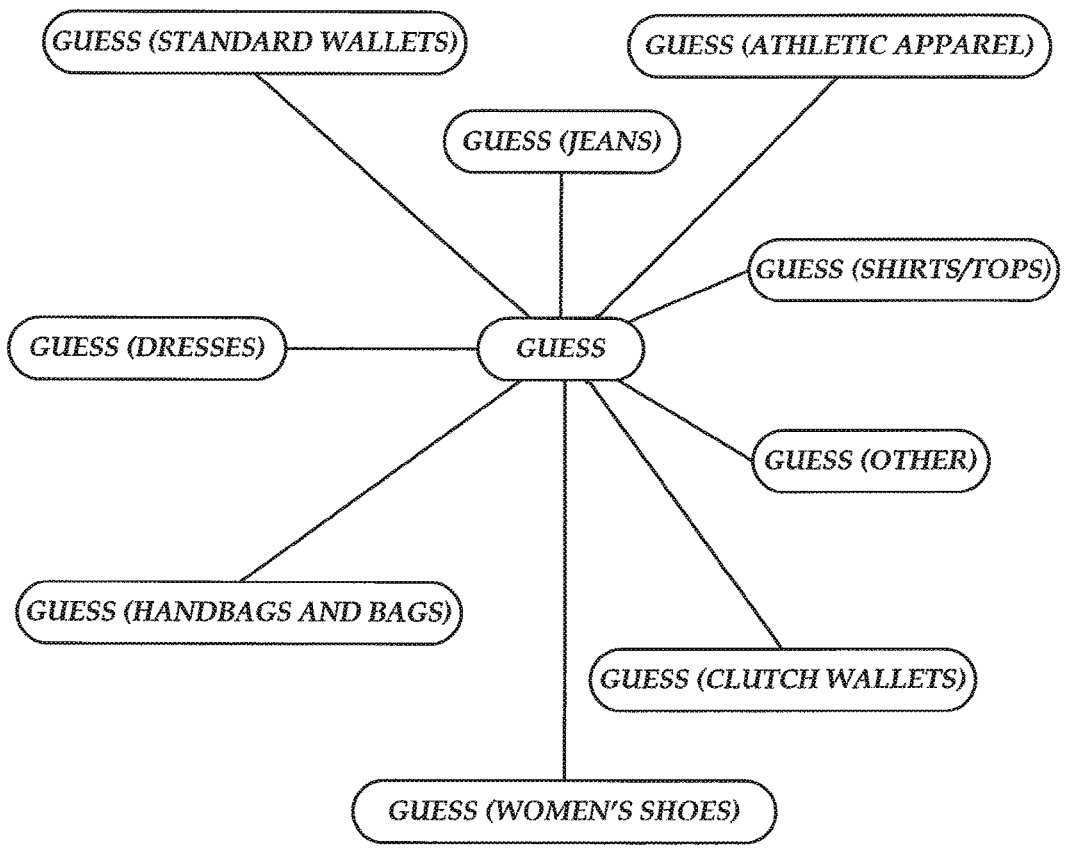
FIG. 16 is an illustration of example categories associated with a brand.

A brand loyalty table 1508 is populated with records indicating relationships across different categories for the same brand. More specifically, for each brand and category, the brand loyalty table 1508 may include at least one record for the same brand within another category and a recommendation score as described above in connection with FIG. 11. For example, the brand loyalty table 1508 may be accessed to provide a recommendation to a user that purchased shoes having a particular brand to also purchase a handbag of the particular brand. An example of the relationships that may be recorded in the brand loyalty table 1508 is provided as an illustration in FIG. 16 where the brand is connected to more than one category. In some embodiments, FIG. 16 (or a similar illustration) may be provided as a user interface to a user to navigate between items having the same brands across categories.

Figure 17:
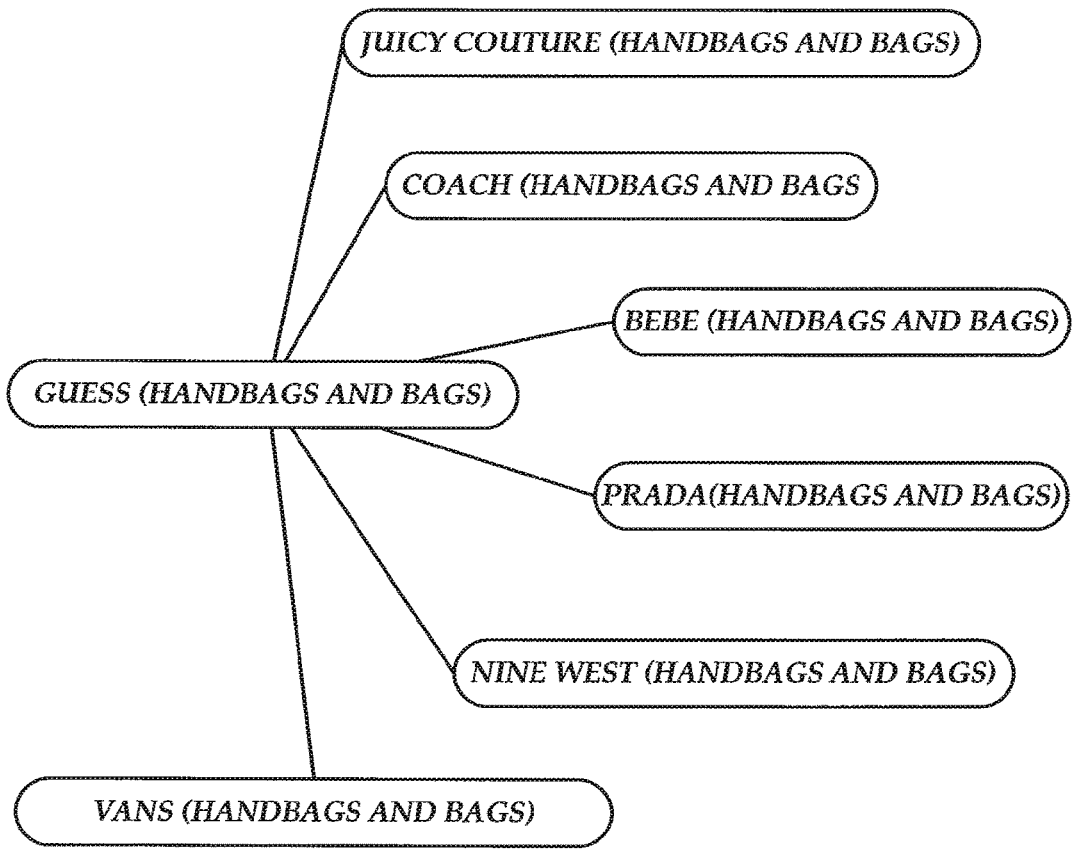
FIG. 17 is an illustration of example brands associated with a category.

A substitution table 1510 is populated with records indicating relationships across different brands for a single category. The substitution table 1510 may include, for each brand and category, at least record indicating another brand-category pair within the same category and a recommendation score. The substitution table 1510 may be accessed to provide a recommendation if, for example, the user bids on an item for auction but did not win the auction. Items within the same category (e.g., women's shoes) but having a different brand may be recommended. An example of the relationships that may be recorded in the substitution table 1510 is provided as an illustration in FIG. 17 where the brand and category is connected to other brands within the same category. FIG. 17 (or a similar illustration) may be provided as a user interface to a user to navigate between items having the same brand within the same category.

Figure 18:
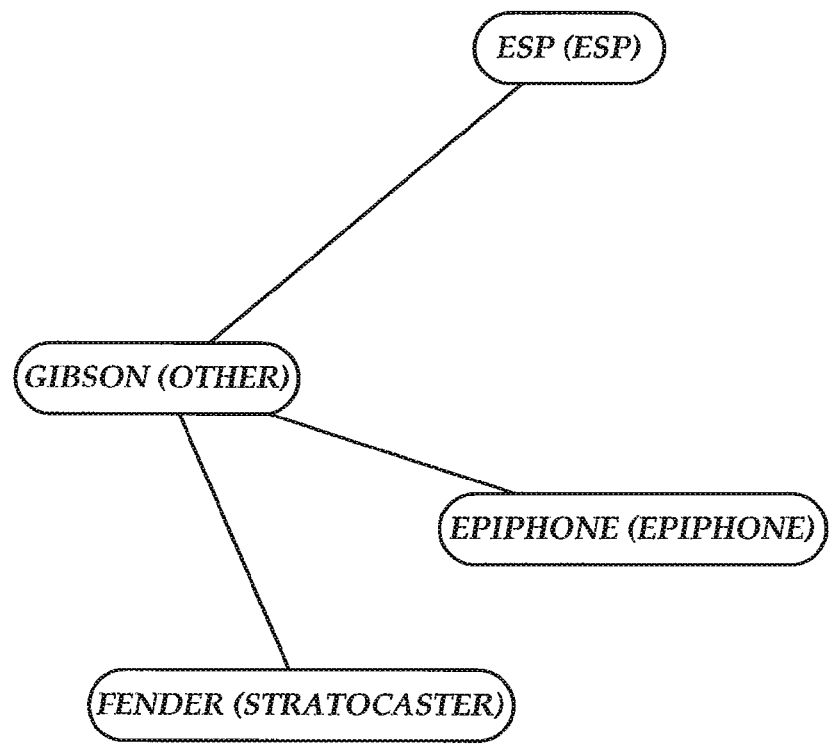
FIG. 18 is an illustration of example cross-relationships between brands and categories.

A cross-relationships table 1512 is populated with records indicating relationships across brands and categories. The cross-relationships table 1512 includes recommendation scores for brand-category pairs that do not have either brand or category in common. An example of the relationships that may be recorded in the cross-relationships table 1512 is provided as an illustration in FIG. 18 where the brand and category is connected to other brands across other categories. FIG. 18 (or a similar illustration) may be provided as a user interface to a user to navigate between cross-recommendations.

Based on the techniques and system described, recommendations may be provided to limited number of users. For example, items for sale may be shown to users based on their previous behavior. If a user purchased or bid on an item having certain brand and category in the past, inventory belonging to various combinations of brand and category is shown to the user.

Same Brand Different Category (SBDC) recommendations are provided to users based on the user's past activity associated with selected brand/category pairs. The SBDC recommendations include items of the same brand but in a different category. For example, if a user purchased or bid on a Gap sweater, the recommendations may be Gap jeans, Gap shirts, and Gap accessories.

Different Brand Same Category (DBSC) recommendations are also provided to users based on the user's past activity associated with selected brand/category pairs. The DBSC recommendations included items in the same category but of a different brand. For example, if the user purchased or bid on a Gap sweater, the recommendations presented to the user may include J. Crew, Banana Republic, and Express sweaters.

The recommendations may be retrieved from the inverted index in the relationships database 212 (e.g., from the brand loyalty table 1508, the substitution table 1510, and/or the cross-recommendations table 1512) based, for example, on the last three purchases or the last three unsuccessful auction bids submit by the user. The number of impressions and the click-through ratios (CTR) are shown in FIG. 19 for a set of approximately 1000 users. The impression rates for different categories differ in part based on popularity.

Experiment results are shown in FIG. 20 for a test set of a thousand users for recommendations shown to the users based on previous branded (completed) purchases. As shown, SBDC recommendations perform better than DBSC recommendations for the Clothing, Shoes & Accessories category by 7% in terms of CTR. DBSC recommendations perform better than SBDC recommendations for the Electronics category by 13% in terms of CTR. SBDC recommendations perform better than DBSC recommendations for the all other categories by 20% in terms of CTR. For users who possess brand loyalty and who have already made recent purchases, it may be desirable to suggest merchandise of the same brand as previous purchase, which may be complementary to what was bought. However, this does not hold true for Electronics. As shown, people prefer DBSC as compared to SBDC for Electronics. This may be the result of the test consisting of many users who prefer to buy multiple accessories or because of power buyers who tend to buy a quantity of items of the same kind for reselling later.

Figure 21:
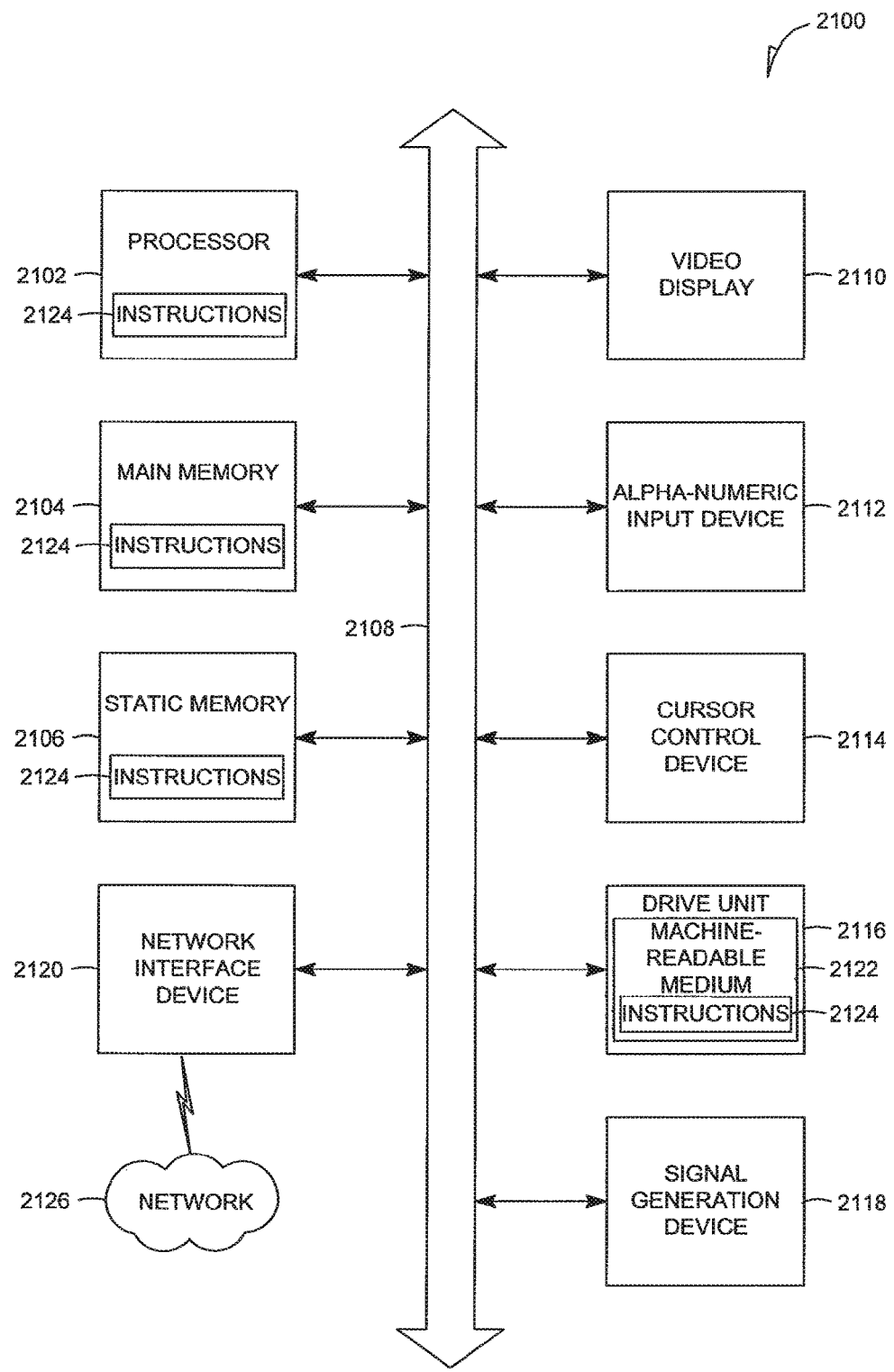
FIG. 21 is a high-level diagram of a computer system according to various embodiments.

FIG. 21 shows a diagrammatic representation of machine in the example form of a computer system 2100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU) a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a cursor control device 2114 (e.g., a mouse), a disk drive unit 2116, a signal generation device 2118 (e.g., a speaker) and a network interface device 2120.

The disk drive unit 2116 includes a machine-readable storage medium 2122 on which is stored one or more sets of instructions (e.g., software 2124) embodying any one or more of the methodologies or functions described herein. The software 2124 may also reside, completely or at least partially, within the main memory 2104 and/or within the processor 2102 during execution thereof by the computer system 2100, the main memory 2104 and the processor 2102 also constituting machine-readable storage media.

The software 2124 may further be transmitted or received over a network 2126 via the network interface device 2120.

While the machine-readable storage medium 2122 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system to determine brand relationships have been described. The method and system described herein may operate to provide one or more technical solutions to technical problems including, but not limited to, improved database management, faster access to query results, more accurate query results, and providing a better user experience in the online publication system. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
maintaining an index comprising predetermined brand relationships, each predetermined brand relationship comprising a first brand, a second brand, and a recommendation score between the first brand and the second brand;
maintaining a corpus containing a plurality of user queries;
expanding, using one or more hardware processors, a seed set of brands corresponding to a category in the index, the expanding comprising:
accessing the corpus containing the plurality of user queries;
evaluating user queries of the plurality of user queries that contain a disjunction of brand terms; and
identifying a new brand to add to the seed set based on the evaluating.

2. The method of claim 1, wherein the evaluating further comprises:
creating a candidate list comprising terms that occur frequently with seed brands; and
removing terms from the candidate list that occur less than a minimum number of co-occurrences.

3. The method of claim 1, wherein the evaluating further comprises:
creating a candidate list comprising terms that occur frequently with seed brands; and
removing terms from the candidate list that occur less than a minimum occurrence percentage.

4. The system of claim 1, further comprising identifying at least one variation of the first brand or the second brand.

5. The system of claim 1, further comprising determining a semantic similarity between user queries of the plurality of queries, wherein the semantic similarity is based on common terms in the user queries.

6. The method of claim 1, wherein the first brand corresponds to a first category and the second brand corresponds to a second category.

7. The system of claim 6, wherein the first category and the second category correspond to a same category.

8. The method of claim 1, further comprising:
receiving an indication of a user activity performed by a user;
identifying a brand preference from the user activity;
determining a recommendation to provide to the user based on the brand preference, the determining comprising querying the index using the brand preference to determine a further brand having a highest recommendation score; and
providing the recommendation to the user.

9. The method of claim 1, further comprising:
receiving an indication of a user activity performed by a user;
identifying a brand preference and a category from the user activity;
determining a recommendation to provide to the user based on the brand preference, the determining comprising querying the index using the brand preference; and
providing the recommendation to the user, the recommendation comprising the brand preference in a different category than the category identified from the user activity.

10. The method of claim 1, further comprising:
mining the user queries to identify relationships between the user queries;
mapping the user queries to categories; and
generating the plurality of brand relationships by mapping the relationships between the user queries.

11. A system comprising:
a first memory to store an index comprising predetermined brand relationships, each predetermined brand relationship comprising a first brand, a second brand, and a recommendation score between the first brand and the second brand;
a second memory to store a corpus containing a plurality of user queries; and
one or more hardware processors configured to expand a seed set of brands corresponding to a category in the index, the one or more hardware processors to expand the seed set by performing operations comprising:
accessing the corpus containing the plurality of user queries;
evaluating user queries of the plurality of user queries that contain a disjunction of brand terms; and
identifying a new brand to add to the seed set based on the evaluating.

12. The system of claim 11, wherein the evaluating further comprises:
creating a candidate list comprising terms that occur frequently with seed brands; and
removing terms from the candidate list that occur less than a minimum number of co-occurrences.

13. The system of claim 11, wherein the evaluating further comprises:
creating a candidate list comprising terms that occur frequently with seed brands; and
removing terms from the candidate list that occur less than a minimum occurrence percentage.

14. The system of claim 11, wherein the one or more hardware processors are further configured to perform operations comprising:
receiving an indication of a user activity performed by a user;
identifying a brand preference from the user activity;
determining a recommendation to provide to the user based on the brand preference, the determining comprising querying the index using the brand preference to determine a further brand having a highest recommendation score; and
providing the recommendation to the user.

15. The system of claim 11, wherein the one or more hardware processors are further configured to perform operations comprising:
receiving an indication of a user activity performed by a user;
identifying a brand preference and a category from the user activity;
determining a recommendation to provide to the user based on the brand preference, the determining comprising querying the index using the brand preference; and
providing the recommendation to the user, the recommendation comprising the brand preference in a different category than the category identified from the user activity.

16. A tangible machine-readable storage device having instructions embodied thereon that, when executed by one or more hardware processors of a machine, cause the machine to perform operations comprising:
- maintaining an index comprising predetermined brand relationships, each predetermined brand relationship comprising a first brand, a second brand, and a recommendation score between the first brand and the second brand;
- maintaining a corpus containing a plurality of user queries;
- expanding a seed set of brands corresponding to a category in the index, the expanding comprising:
  - accessing the corpus containing the plurality of user queries;
  - evaluating user queries of the plurality of user queries that contain a disjunction of brand terms; and
  - identifying a new brand to add to the seed set based on the evaluating.

17. The tangible machine-readable storage device of claim 16, wherein the evaluating further comprises:
- creating a candidate list comprising terms that occur frequently with seed brands; and
- removing terms from the candidate list that occur less than a minimum number of co-occurrences.

18. The tangible machine-readable storage device of claim 16, wherein the evaluating further comprises:
- creating a candidate list comprising terms that occur frequently with seed brands; and
- removing terms from the candidate list that occur less than a minimum occurrence percentage.

19. The tangible machine-readable storage device of claim 16, wherein the operations further comprise:
- receiving an indication of a user activity performed by a user;
- identifying a brand preference from the user activity;
- determining a recommendation to provide to the user based on the brand preference, the determining comprising querying the index using the brand preference to determine a further brand having a highest recommendation score; and
- providing the recommendation to the user.

20. The tangible machine-readable storage device of claim 16, wherein the operations further comprise:
- receiving an indication of a user activity performed by a user;
- identifying a brand preference and a category from the user activity;
- determining a recommendation to provide to the user based on the brand preference, the determining comprising querying the index using the brand preference; and
- providing the recommendation to the user, the recommendation comprising the brand preference in a different category than the category identified from the user activity.

* * * * *